United States Patent Office 3,798,115
Patented Mar. 19, 1974

3,798,115
LAMINATES OF POLYPROPYLENE
AND POLYAMIDE
Alfred Hofmann, Bobenheim-Roxheim, and Hans-Peter Weiss, Altrip, Germany, assignors to Badische Anilin- & Soda-Fabrik Aktiengesellschaft, Ludwigshafen am Rhine, Germany
No Drawing. Filed Feb. 1, 1972, Ser. No. 222,646
Int. Cl. B32b 27/32, 27/34
U.S. Cl. 161—227    1 Claim

ABSTRACT OF THE DISCLOSURE

Improvement in sandwich-type polypropylene/polyamide laminates consisting of a layer of a mixture of polypropylene (PP) and polyamide (PA) (layer 2) sandwiched between outer layers 1 and 3 of polypropylene and polyamide respectively. The improvement consists in that (α) the polypropylene (PP) used is a specific mixture of
   (a) a polypropylene of which less than 1% by weight is soluble in boiling toluene and
   (b) a polypropylene of which more than 99% by weight is soluble in boiling toluene, provided that the polypropylenes (a) and (b) have (substantially) the same intrinsic viscosities, (substantially) the same molecular weight distributions and specific intrinsic viscosities ($\eta$), and
(β) the polyamide (PA) is a polycaprolactam having a specific viscosity and specific melting point.

The laminates of the invention have improved permeability to water vapor, relatively low permeability to oxygen and relatively high stiffness and are therefore particularly suitable for packaging foodstuffs.

---

The present invention relates to sandwich-type polypropylene/polyamide laminates consisting of (1) an outer layer of polypropylene (PP) having a thickness of from 0.02 to 1.2 mm.,
(2) an inner layer having a thickness of from 0.01 to 0.7 mm. and consisting of an intimate mixture of from 30 to 70% by weight of polypropylene (PP) and from 70 to 30% by weight of polyamide (PA) and
(3) an outer layer of polyamide (PA) having a thickness of from 0.01 to 1.1 mm., the total thickness of the laminate not being more than 1.5 mm.

Known laminates of this kind have one or other advantage over other laminates of a comparable nature; for example they have the advantage of relatively low permeability to water vapor.

This last-named property may be an advantage or disadvantage depending on the use to which the laminate is to be put; for example, it is often a disadvantage in materials for packaging foodstuffs, such as plastics film, bags, cups or bowls.

It is an object of the invention to provide laminates of the kind defined above having relatively high permeability to water vapor but low permeability to oxygen and relatively high stiffness.

We have found that this object is achieved with laminates in which (α) the polypropylene (PP) is a specific mixture of two specific polypropylenes and
(β) the polyamide (PA) is a specific polycaprolactam.

Accordingly, the present invention is concerned with sandwich-type three-layer polypropylene/polyamide laminates consisting of (1) an outer layer of polypropylene (PP) having a thickness of from 0.02 to 1.2 mm.,
(2) an inner layer having a thickness of from 0.01 to 0.7 mm., and consisting of a mixture of from 30 to 70% by weight of polypropylene (PP) and from 70 to 30% by weight of polyamide (PA) and
(3) an outer layer of polyamide (PA) having a thickness of from 0.01 to 1.1 mm., the total thickness of the laminate being not more than 1.5 mm. The laminates of the invention are characterized in that (α) the polypropylene (PP) is a mixture of (a) from 70 to 80 parts by weight of a polypropylene of which less than 1% by weight is soluble in boiling toluene (under standard conditions at a ratio of polypropylene to toluene of 5:95 by weight) and
(b) from 20 to 30 parts by weight of a polypropylene of which more than 99% by weight is soluble in boiling toluene (under standard conditions and at a ratio of polypropylene to toluene of 5:95 by weight), provided that (I) the sum of the parts by weight specified under (a) and (b) is 100,
(II) the polypropylenes defined under (a) and (b) have (substantially) the same intrinsic viscosities and (substantially) the same molecular weight distributions (determined by the method of gel permeation chromatography) and
(III) the intrinsic viscosities ($\eta$) of the polypropylenes defined under (a) and (b) have absolute values (as measured in decahydronaphthalene at 130° C.) ranging from 1 to 10 and preferably from 1.2 to 3.8 dl./g. and
(β) the polyamide (PA) is a polycaprolactam having a relative viscosity (as measured by DIN 53,727) of from 3.15 to 4.20 and preferably from 3.80 to 4.20 and a melting point of approximately 220° C. (i.e. from 218° to 222° C.).

(By the term "substantially) the same" we mean, in each case, that neither of the values varies from the mean of the two values by more than ±5%).

The following is a detailed description of the layers in the laminates of the invention:

Outer layer (1) consists of a specific mixture of two specific polypropylenes. The mixture may be obtained in a simple manner when two well-known facts are borne in mind:

Firstly, that in the conventional polymerization of propylene by the Ziegler-Natta method (carried out for example in toluene) a polypropylene is obtained which consists of a portion which is soluble in boiling toluene and a portion which is not, the intrinsic viscosity of the soluble portion being considerably lower than that of the insoluble portion;

Secondly, that in this conventional polymerization it is possible, by varying the process conditions (using different molecular weight regulators, altering temperature and pressure, modifying the catalyst system) to produce a polypropylene which, as a whole (i.e. in both its soluble and insoluble portions) has an intrinsic viscosity which is relatively high or relatively low. Thus it is possible, in two separate batches, to produce a polypropylene (A) having, as a whole, a relatively high intrinsic viscosity, and a polypropylene (B) having, as a whole, a relatively low intrinsic viscosity, while the batches are also controlled so as to provide a toluene-soluble portion of polypropylene (A) which has the same intrinsic viscosity as the toluene-insoluble portion of polypropylene (B) (if the polypropylenes A and B have each been prepared under similar process conditions, then their molecular weight distributions will generally also be the same or substantially the same). By mixing the two last-named portions of the products in the required proportions (for example in a kneader or extruder), it is possible to obtain the polypropylene mixture defined above. It will be appreciated that the manner in which the polypropylene mixture has been prepared is not critical but that only the specific recipe of the mixture is important for the purposes of the invention.

The inner layer (2) consists of a specific mixture of the said polypropylene (PP) and the polyamide (PA). This mixture may be simply obtained from the ingredients, for example by intimate mixing in a kneader or extruder.

The outer layer (3) consists of a specific polycaprolactam. This is commercially available and thus requires no further description.

It should be noted that the materials of which the layers (1), (2) and (3) are formed may also contain conventional auxiliaries or additives such as dyes (pigments) and aging retardants.

The following is a description of the method of making the laminates of the invention:

Laminate preparation may be carried out in conventional manner, preferably by extrusion, the individual components for layers (1), (2) and (3) being coextruded. The dies used may be sheeting dies or annular dies (if desired with concentric die gaps). Suitable barrel temperatures are:

from 170° to 260° C. for the polypropylene (PP),
from 190° to 260° C. for the mixture of PP and PA, and
from 225° to 280° C. for the polyamide (PA).

The separate molten layers may be united either within the extruder head or blow nozzle or shortly after leaving the extruder. Appropriate designs of extruder head or blow nozzle are known. The layers are pressed together while still in a plastic condition in conventional manner, for example by means of twin rolls or compressed air. The thickness of the different layers may be varied by altering the rotary speed of the extruder.

A particularly suitable form of the laminates of the invention is film. Such film may be used for conventional applications and particularly for packaging foodstuffs.

The mixture of two specific polypropylenes used in the following examples was obtained as follows:

The starting materials were (A) a commercial fine polypropylene powder consisting of a (boiling) toluene-insoluble portion and a toluene-soluble portion. The intrinsic viscosities ($\eta$) (as measured in Dekalin at 130° C.) are 3.6 dl./g. for the insoluble portion and 2.6 dl./g. for the soluble portion;
(B) a different commercial fine polypropylene powder consisting of a toluene-soluble and a toluene-insoluble portion. The intrinsic viscosities ($\eta$) (as measured in Dekalin at 130° C.) are: 2.7 dl./g. insoluble portion, 1.6 dl./g. soluble portion.

By extracting with boiling toluene, the soluble portion of the propylene (A) is separated therefrom and the insoluble portion of polypropylene (B) is isolated, and these two portions are intimately mixed in a ratio of 25:75 by weight in an extruder at a temperature of 220° C. The molecular weight distributions of the two portions (as measured by gel permeation chromatography) are approximately the same.

The mixture of polypropylene (PP) and polyamide (PA) used in the following example was obtained by intimately mixing the aforementioned polypropylene mixture with a polycaprolactam having a relative viscosity (as measured by DIN 53,727) of approximately 4 and a melting point of 220° C. (ratio of PP to PA is 55:45 by weight, mixing apparatus used is an extruder operated at 235° C.).

The polycaprolactam used alone in the following example also has a relative viscosity (as measured by DIN 53,727) of about 4 and a melting point of 220° C.

EXAMPLE

Conventional apparatus for making three-layer blown sheeting is used. The blow nozzle of this apparatus has three concentric annular gaps each having a width of 0.7 mm. Each of these three annular gaps is provided with material from a separate extruder. Material flows downwardly through the apparatus.

The apparatus is operated in such a manner that polypropylene is extruded through the inner nozzle at a temperature of 200° C. and a rate of 35 kg./hr., the polypropylene/polyamide mixture is extruded through the middle nozzle at a temperature of 230° C. and a rate of 10 kg./hr. and the polyamide is extruded through the outer nozzle at a temperature of 265° C. and a rate of 27 kg./hr. The resulting molten plastic tubing is blown out with compressed air to a diameter of 300 mm. This causes the three layers to unite and interweld. The resulting blown film is cooled, hauled off between rolls and then wound onto reels. The film has a relatively high permeability to water vapor and the thicknesses of its layers are: polypropylene 0.05 mm., polypropylene/polyamide 0.015 mm. and polyamide 0.04 mm.

We claim:
1. A sandwich-type three-layer polypropylene/polyamide laminate consisting of
 (1) an outer layer of polypropylene (PP) having a thickness of from 0.02 to 1.2 mm.,
 (2) an inner layer having a thickness of from 0.01 to 0.7 mm. and consisting of a mixture of from 30 to 70% by weight of polypropylene (PP) and from 70 to 30% by weight of polyamide (PA) and
 (3) an outer layer of polyamide (PA) having a thickness of from 0.01 to 1.1 mm., the total thickness of the laminate being not more than 1.5 mm., wherein
 ($\alpha$) the polypropylene (PP) is a mixture of
  (a) from 70 to 80 parts by weight of a polypropylene of which less than 1% by weight is soluble in boiling toluene under standard conditions and at a ratio of polypropylene to toluene of 5:95 by weight and
  (b) from 20 to 30 parts by weight of a polypropylene of which more than 99% by weight is soluble in boiling toluene under standard conditions and at a ratio of polypropylene to toluene of 5:95 my weight, provided that
 (I) the sum of the parts by weight specified under (a) and (b) above is 100,
 (II) the polypropylenes defined under (a) and (b) above have substantially the same intrinsic viscosities and substantially the same molecular weight distributions as determined by gel permeation chromatography and (III) the intrinsic viscosities ($\eta$) of the polypropylenes defined under (a) and (b) above have absolute values as measured in Dekalin at 130° C. ranging from 1 to 10 and ($\beta$) the polyamide (PA) is a polycaprolactam having a relative viscosity of from 3.15 to 4.20 and a melting point of approximately 220° C.

References Cited

UNITED STATES PATENTS

| | | | |
|---|---|---|---|
| 2,598,090 | 5/1952 | Yung et al. | 161—227 X |
| 2,909,443 | 10/1959 | Wolinski | 161—227 X |
| 3,264,168 | 8/1966 | Sneary | 161—227 |
| 3,370,972 | 2/1968 | Nagel et al. | 117—7 |
| 3,454,210 | 7/1969 | Spiegel et al. | 161—252 X |
| 3,547,754 | 12/1970 | Tokos et al. | 161—252 X |
| 3,553,073 | 1/1971 | Rausing et al. | 161—252 X |
| 3,746,609 | 7/1973 | Stange et al. | 161—247 X |

HAROLD ANSHER, Primary Examiner

U.S. Cl. X.R.

161—252

UNITED STATES PATENT OFFICE
CERTIFICATE OF CORRECTION

Patent No. 3,798,115            Dated March 19, 1974

Inventor(s) Alfred Hofmann and Hans-Peter Weiss

It is certified that error appears in the above-identified patent and that said Letters Patent are hereby corrected as shown below:

Column 1, line 9, insert
-- [30] Foreign Application Priority Data
      February 4, 1971     Germany . . . . P 21 05 168.3 --.

Column 1, line 33, "The", first occurence, should not begin a new paragraph.

Signed and sealed this 22nd day of October 1974.

(SEAL)
Attest:

McCOY M. GIBSON JR.            C. MARSHALL DANN
Attesting Officer              Commissioner of Patents